US008903069B2

(12) United States Patent
Sylvain

(10) Patent No.: US 8,903,069 B2
(45) Date of Patent: *Dec. 2, 2014

(54) INTERACTIVE CONTENT FOR CLICK-TO-CALL CALLS

(71) Applicant: Rockstar Consortium US LP, Plano, TX (US)

(72) Inventor: Dany Sylvain, Gatineau (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/928,594

(22) Filed: Jun. 27, 2013

(65) Prior Publication Data

US 2013/0287200 A1 Oct. 31, 2013

Related U.S. Application Data

(63) Continuation of application No. 13/303,566, filed on Nov. 23, 2011, now Pat. No. 8,477,919, which is a continuation of application No. 11/615,435, filed on Dec. 22, 2006, now Pat. No. 8,081,744.

(51) Int. Cl.

| | |
|---|---|
| *H04M 3/42* | (2006.01) |
| *H04M 3/00* | (2006.01) |
| *H04M 5/00* | (2006.01) |
| *H04M 3/428* | (2006.01) |
| *H04M 3/44* | (2006.01) |
| *H04M 7/00* | (2006.01) |
| *H04M 7/12* | (2006.01) |
| *H04M 3/523* | (2006.01) |

(52) U.S. Cl.
CPC ............... *H04M 3/44* (2013.01); *H04M 3/5238* (2013.01); *H04M 3/4285* (2013.01); *H04M 7/003* (2013.01); *H04M 7/123* (2013.01)
USPC ............ 379/201.03; 379/201.01; 379/201.05; 379/265.09

(58) Field of Classification Search
USPC ............. 379/114.13, 216.01, 201.03, 201.01, 379/201.05, 265.09, 266.01, 207.02; 370/352; 709/227

See application file for complete search history.

(56) References Cited

U.S. PATENT DOCUMENTS

| | | | |
|---|---|---|---|
| 7,746,990 B1 * | 6/2010 | Fabbrizio et al. ........ | 379/114.13 |
| 8,081,744 B2 | 12/2011 | Sylvain | |

(Continued)

FOREIGN PATENT DOCUMENTS

| | | |
|---|---|---|
| WO | 0150729 A1 | 7/2001 |
| WO | 02096068 A2 | 11/2002 |
| WO | 2006082580 A2 | 8/2006 |

OTHER PUBLICATIONS

European Search Report for Patent Application No. 08000950.9, mailed Dec. 8, 2009, 6 pages.

(Continued)

*Primary Examiner* — Thjuan K Addy
(74) *Attorney, Agent, or Firm* — Withrow & Terranova, PLLC

(57) ABSTRACT

In a click-to-call (C2C) communication environment, a web client of a computing terminal is configured to initiate a C2C call when a user selects a call tag provided in a web page being presented to the user. The call is intended to be established between a remote endpoint associated with the call tag and one of either the computing terminal or another terminal associated with the user. If the C2C call is directed to an automated system and placed in a queue or on hold, the present invention allows supplemental content intended for the user to be delivered to the web client from which the C2C call was initiated. The web client may present the supplemental content to the user.

35 Claims, 11 Drawing Sheets

(56) References Cited

U.S. PATENT DOCUMENTS

| | | |
|---|---|---|
| 8,477,919 B2 | 7/2013 | Sylvain |
| 2007/0061468 A1 | 3/2007 | Kelly et al. |
| 2007/0189267 A1 | 8/2007 | Metcalf et al. |
| 2010/0178876 A1 | 7/2010 | Krzyzanowski et al. |

OTHER PUBLICATIONS

Non-final Office Action for U.S. Appl. No. 11/615,435, mailed Jul. 8, 2010, 7 pages.
Final Office Action for U.S. Appl. No. 11/615,435, mailed Feb. 2, 2011, 9 pages.
Board of Patent Appeals and Interferences Pre-Appeal Decision for U.S. Appl. No. 11/615,435, mailed Jun. 10, 2011, 2 pages.
Notice of Allowance for U.S. Appl. No. 11/615,435, mailed Aug. 17, 2011, 5 pages.
Non-Final Office Action for U.S. Appl. No. 13/303,566, mailed Oct. 1, 2012, 6 pages.
Notice of Allowance for U.S. Appl. No. 13/303,566, mailed Feb. 27, 2013, 5 pages.
Supplemental Notice of Allowance for U.S. Appl. No. 13/303,566, mailed Jun. 4, 2013, 2 pages.

* cited by examiner

INTERACTIVE CONTENT FOR CLICK-TO-CALL CALLS

This application is a continuation of co-pending U.S. patent application Ser. No. 13/303,566, filed on Nov. 23, 2011, entitled INTERACTIVE CONTENT FOR CLICK-TO-CALL CALLS, which is a continuation of U.S. patent application Ser. No. 11/615,435, filed on Dec. 22, 2006, entitled INTERACTIVE CONTENT CLICK-TO-CALL CALLS, now U.S. Pat. No. 8,081,744, each of which is hereby incorporated herein by reference in their entireties.

FIELD OF DISCLOSURE

The present invention relates to telecommunications, and in particular to providing supplemental content to a user after the user initiates a click-to-call call.

BACKGROUND

As the Internet and associated web services evolve, there is a movement to associate telephony calls with certain web applications. In click-to-call (C2C) scenarios, a call tag used to initiate a telephony call may be provided in a web page, which is supported by a web client, such as a browser, of the user's terminal. When a user selects the call tag, the web client may initiate the call by sending appropriate instructions to the web server. The web server may then instruct a call server to establish the call between the user terminal and a remote endpoint or between another terminal associated with the user and the remote endpoint. Whether the telephony call is established with the user's terminal providing the web client or another terminal associated with the user may be controlled by the user.

In many C2C call scenarios, the call tags provided in the web pages are associated with commercial entities, and as such, the calls initiated upon selecting the call tags are directed to these commercial entities. A large percentage of commercial entities employ automated attendant systems, which automatically answer and process incoming calls. In many instances, the automated attendant systems are used to route the calls to automated or human agents. If such agents are not immediately available when calls are answered, the calls are placed into a queue. The queued calls are routed to the appropriate agents as the agents become available.

The amount of time a caller remains in a queue, and thus has to wait for an agent, is often significant. Although the commercial entity has direct and valuable access to the caller during the caller's wait, the ability to provide useful information, advertising information, entertainment, or a combination thereof has proven to be quite limited. All of this information is generally provided over the voice connection that was established for the call. In many instances, the same audio-based information or entertainment loop is provided to all callers that are in the queue. Other callers may simply receive an audible message that provides an estimate of the remaining wait time. The ability to provide different information to different callers or to provide a broader spectrum of information to the callers is limited. The ability to provide information in a format other than an audible format is even further limited. In addition, while the caller is waiting on the phone for a free human agent, the commercial entity is typically paying for the telecommunication charges, incurring significant cost.

Accordingly, there is a need for a way to provide more appropriate useful information, advertising information, entertainment, or a combination thereof to callers when they are in a queue waiting for an agent. There is a need to provide information of different types and in different formats to the callers. There is further need to provide such information in a C2C call environment in an efficient and effective manner. There is also a need to provide an option to place a C2C call request in the queue waiting for an agent and delay the setup of the phone call until such time as there is a human agent available to talk to the caller.

SUMMARY

In a click-to-call (C2C) communication environment, a web client of a computing terminal is configured to initiate a C2C call when a user selects a call tag provided in a web page being presented to the user. The call is intended to be established between a remote endpoint associated with the call tag and one of either the computing terminal or another terminal associated with the user. If the C2C call is directed to an automated system and placed in a queue or on hold, the present invention allows supplemental content intended for the user to be delivered to the web client from which the C2C call was initiated. The web client may present the supplemental content to the user.

In one embodiment, the call is first established between the respective endpoints prior to being placed in the queue. In another embodiment, the call is placed in the queue and not established until it is removed from the queue or shortly before being removed from the queue. Regardless of when the call is actually established between the respective endpoints, the supplemental content may be provided to the user while the call resides in the queue.

The supplemental content may be of various types and may be in any format, including formats other than audio formats. For example, text, graphic, and video content may be provided to the web client. The supplemental content may be useful information, advertising information, entertainment, or a combination thereof. Further, the supplemental content may correspond to interactive content, such as gaming content or information interactively controlled by the caller via the web client. The supplemental content may be provided to the caller at any time while the call remains in the queue. In certain embodiments, further supplemental content may be provided after the call is taken out of the queue and routed to an appropriate automated or human agent.

Those skilled in the art will appreciate the scope of the present invention and realize additional aspects thereof after reading the following detailed description of the preferred embodiments in association with the accompanying drawing figures.

DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In a click-to-call (C2C) communication environment, a web client of a computing terminal is configured to initiate a C2C call when a user selects a call tag provided in a web page being presented to the user. The call is intended to be established between a remote endpoint associated with the call tag and one of either the computing terminal or another terminal associated with the user. If the C2C call is directed to an automated system and placed in a queue or on hold, the present invention allows supplemental content intended for the user to be delivered to the web client from which the C2C call was initiated. The web client may present the supplemental content to the user.

In one embodiment, the call is first established between the respective endpoints prior to being placed in the queue. In another embodiment, the call is placed in the queue and not established until is it removed from the queue or shortly before being removed from the queue. Regardless of when the call is actually established between the respective endpoints, the supplemental content may be provided to the user while the call resides in the queue.

The supplemental content may be of various types and may be in any format, including formats other than audio formats. For example, text, graphic, and video content may be provided to the web client. The supplemental content may be useful information, advertising information, entertainment, or a combination thereof. Further, the supplemental content may correspond to interactive content, such as gaming content or information interactively controlled by the caller via the web client. The supplemental content may be provided to the caller at any time while the call remains in the queue. In certain embodiments, further supplemental content may be provided after the call is taken out of the queue and routed to an appropriate automated or human agent. In certain embodiments, further supplemental content may be provided based on information that identifies the caller. Prior to delving into further details of the present invention, an overview of a communication environment in which the present invention may be employed is provided.

Figure 1:
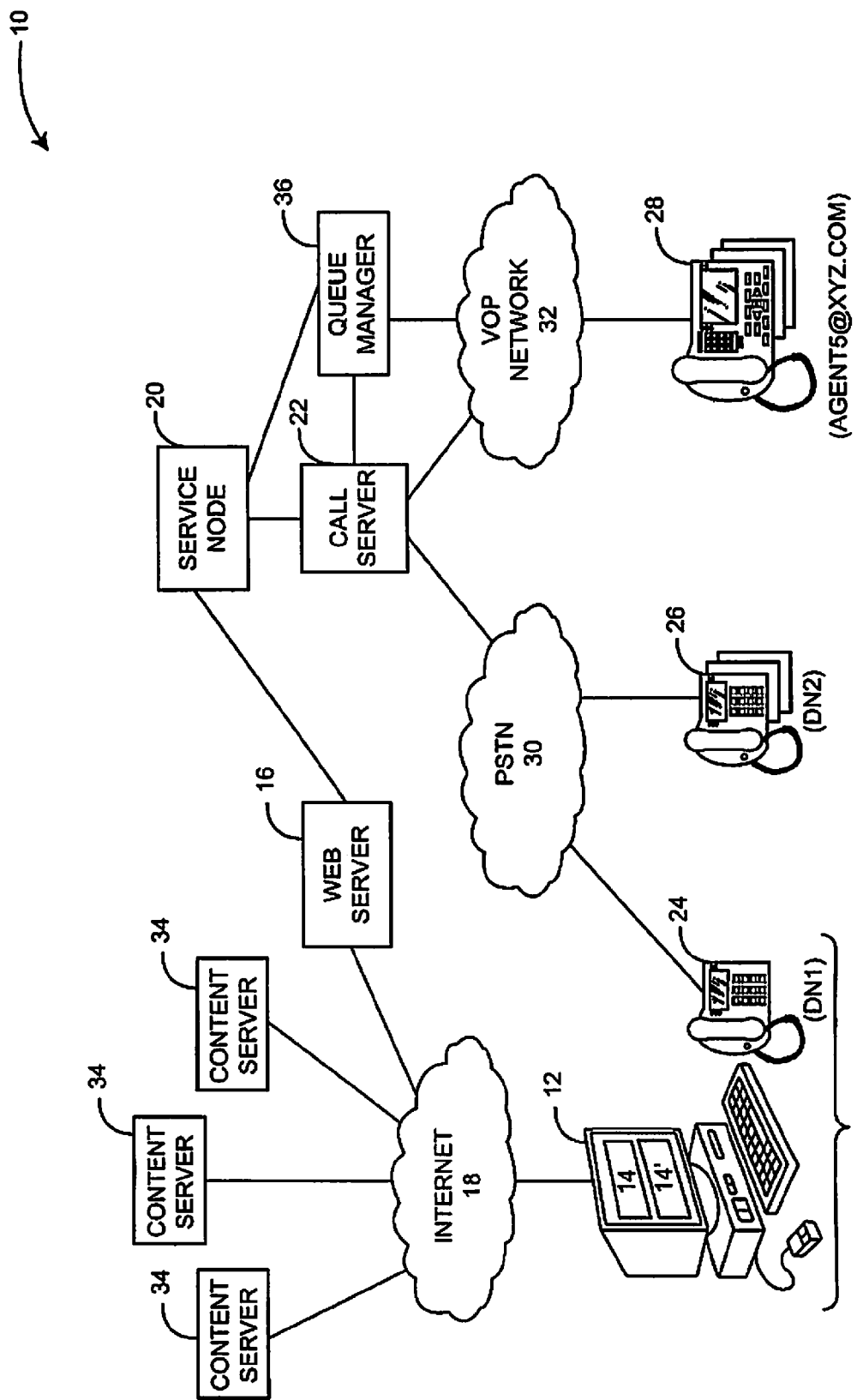
FIG. 1 is a block representation of a communication environment according to one embodiment of the present invention.

FIG. 1 depicts a communication environment 10 that supports C2C functionality according to one embodiment of the present invention. A user (User 1) is associated with a computing terminal 12, which provides a browser 14 and an optional communication client 14'. The browser 14 provides standard browsing functionality and either includes or is configured to cooperate with the communication client 14'. The communication client 14' is configured to support telephony communications at the computing terminal 12.

Via the browser 14, the computing terminal 12 communicates with a web server 16 over the Internet 18 or like communication network. To initiate a C2C call, the browser 14 of the computing terminal 12 sends to the web server 16 a request to initiate a call between two or more endpoints, where one of the endpoints is associated with the user, such as the computing terminal 12 in FIG. 1. The request will generally identify a source and a destination corresponding to the respective endpoints for the call. The request is then sent to a service node 20, which will select an appropriate call server 22 to use for establishing the call between the two endpoints. Once the call server 22 is selected, instructions are sent to the call server 22 to initiate the call. In response, the call server 22 will initiate the call between the two endpoints. Alternatively, the computing terminal 12 may send the request directly to the service node 20 to avoid passing the request through the web server 16. The call server 22 may provide third party call control to initiate calls to both endpoints, wherein a bearer path is established between the endpoints if the user and a remote party answer the respective calls.

As illustrated, the available endpoints include a first terminal 24, second terminals 26, and third terminals 28. The first terminal 24 is associated with User 1 and may be considered a source for the call, even though the call is not originated from the first terminal 24 in a traditional fashion. The second and third terminals 26, 28 are remote endpoints associated with destinations with which User 1 wants to communicate. In the illustrated example, assume that the second and third terminals 26, 28 are associated with one or more call centers where numerous agents are made available to handle calls from any number of users. Also for the illustrated example, assume the first terminal 24 is associated with directory number DN1 while the second and third terminals 26, 28 are associated with a call center, Global Call Center, having main telephony addresses of globalcallcenter@xyz.com or 1-800-XYZ-CORP. The individual terminals of the second and third terminals 26, 28 may have individual addresses or directory numbers. In particular, one second terminal 26 is shown as being associated with a directory number DN2, and one third terminal 28 is shown as being associated with a uniform resource locator (URL) agent5@xyz.com.

As an exemplary embodiment, only the first and second terminals 24, 26 are depicted as being supported by the public switched telephone network (PSTN) 30, which may represent any type of wired or wireless network supporting circuit-switched communications. The third terminals 28 are depicted as being supported by a voice-over-packet (VoP) network 32, such as the Internet or like packet-based network, which supports packet-based communications. The PSTN 30 and the VoP network 32 are considered to include any necessary access networks as well as have the appropriate interworking infrastructure to support communications therebetween.

In many call center environments, incoming calls are directed to a main telephony address, such as a directory number or URL, and placed in a queue provided and managed by a queue manager 36. Those skilled in the art will recognize that the queue manager 36 may be placed in various locations other than that depicted. As depicted, the queue manager 36 is configured to cooperate with the call server 22 to receive calls, place calls in a queue, and direct calls to an available one of the second or third terminals 26, 28. For the present invention, the bearer paths for the calls may be established at different times depending on the desires of the service provider and the call center manager. In one embodiment, when the call is received by the call center, a bearer path is established to the call center. When an agent is available, the call is transferred to the terminal associated with the agent. In another embodiment, the bearer path to the call center is not established until or near the time at which the agent becomes available. Thus, establishment of the bearer path is delayed until a bearer path is actually needed to connect the user to an agent in order to conserve network and call center resources. An example is provided further below.

Also illustrated in FIG. 1 are numerous content servers 34, which may be web servers capable of delivering various types of supplemental content to the browser 14 of computing terminal 12. If the C2C call is placed in a queue, the present invention allows select supplemental content to be delivered to the browser 14, or other web client, from which the C2C call was initiated. The browser 14 may then present the supplemental content to the user at any time while the call remains in the queue or even after the call is removed from the queue and transferred to an agent. Although different types of supplemental content are illustrated as being provided by respective content servers 34, any given content server 34 may be configured to provide different types of supplemental content. Further, supplemental content may be provided by any entity, such as the queue manager 36, service node 20, call server 22, and the like. An example illustrating use of the content servers 34 and the queue manager 36 to deliver supplemental content is provided further below.

C2C calls are often triggered by a user selecting a call tag in a software entity provided by the computing terminal 12. When the call tag is selected, the call indicia associated with the call tag is processed to control initiation of the telephony call for the computing terminal 12. The call tag may be an icon, string, link, or any other element that is selectable by the user and associated with call indicia for establishing a call with a given destination. The call indicia may be a directory number or telephony address associated with the destination. The computing terminal 12 may obtain user indicia from the user to assist in determining how or where the call should be initiated. Based on the call indicia and any available user indicia, a request to initiate the call is sent to the web server 16, which will send a corresponding request to the service node 20.

The software entity may be any type of electronic document, such as a web page, instant message, email, word processing document, or spreadsheet. The communication client 14' may be co-resident with an application supporting the electronic document, or part of an application having a call tag. The application supporting the electronic document or a supporting operating system may be configured to recognize a request in response to selecting a call tag. Alternatively, another application may be configured to automatically detect and process the call indicia in response to a user selecting a call tag.

Figure 2:
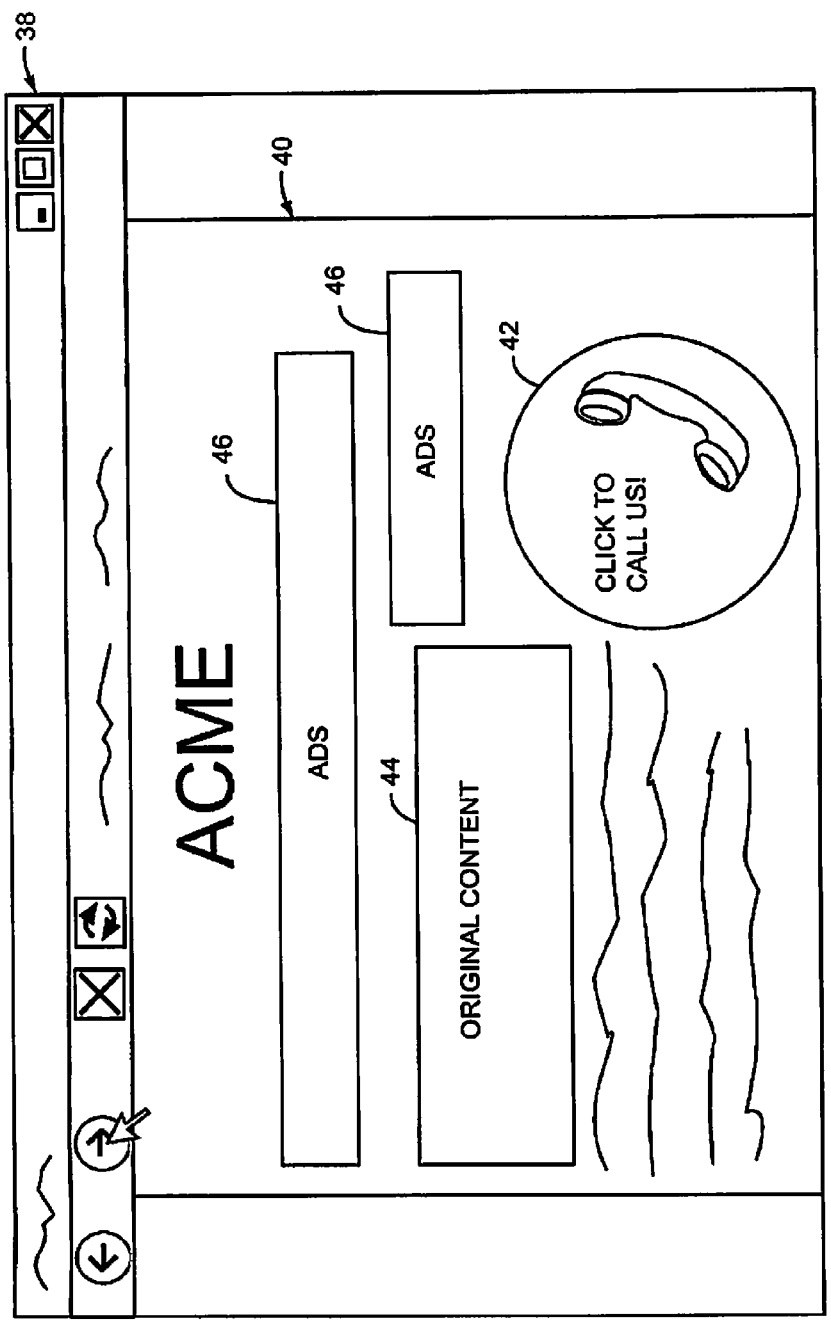
FIG. 2 illustrates a web page including a click-to-call tag displayed on a browser.

With reference to FIG. 2, a browser interface is illustrated from a user perspective, where a call tag is selected. In this example, a browser interface 38 provided by the browser 14 is capable of receiving and displaying a web page 40 on the computing terminal 12. Embedded in the web page 38 is a C2C tag 42. The C2C tag 42 is provided in the web page 40 to allow the user to simply click or otherwise select the C2C tag 42 and establish a call with a remote endpoint, such as the second or third terminals 26, 28 directly or via an associated call handling service, using associated call indicia. When the C2C tag 42 is selected by the user, the computing terminal 12 may query the user for user indicia to assist in establishing the call with the remote endpoint.

As illustrated, the web page 40 may include a variety of content, including original content 44 and advertising 46. The original content 44 and the advertising 46 may have C2C tags 42 associated therewith. Further, the original content 44 may be search results provided by the web server 16 in response to a search query or content associated with a given URL.

Figure 3:
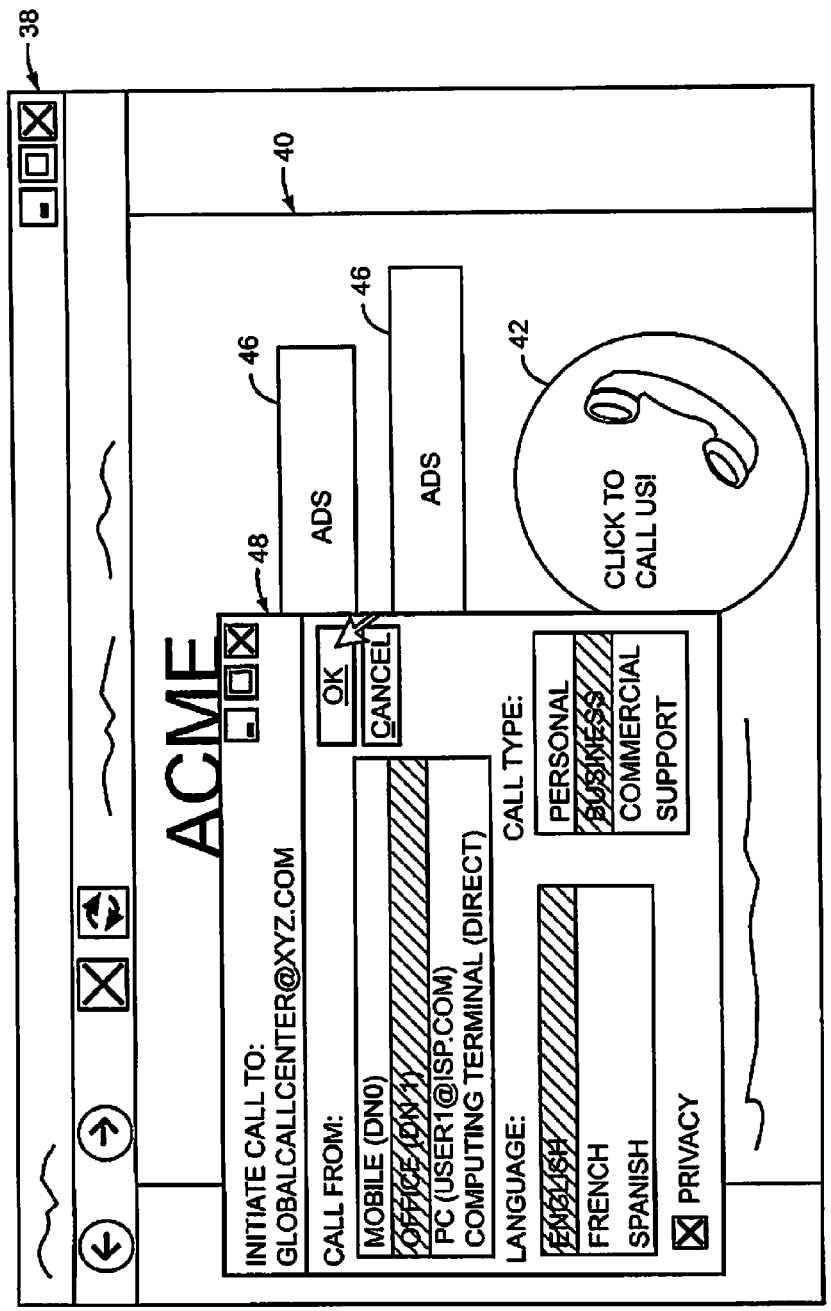
FIG. 3 illustrates a pop-up window provided upon selecting the click-to-call tag provided in the web page illustrated in FIG. 3.

With reference to FIG. 3, the computing terminal 12 may provide a pop-up window 48 in response to determining that the C2C tag 42 was selected. The pop-up window 48 may identify the remote endpoint by name or by telephony address in a general or specific fashion. In this example, the remote endpoint represents a general network address (globalcallcenter@xyz.com) or directory number (1-800-XYZ-CORP) for a global call center. The type of communication address may correspond to a directory number, a Session Initiation Protocol (SIP) address, a peer-to-peer address, or a URL. The second and third terminals 26, 28 may be associated with the global call center and may represent specific endpoints associated with the general, remote endpoint.

The pop-up window 48 may also allow the user to select a direct or indirect method for establishing the call, and if indirect, another endpoint to use for the call. As illustrated, the user is provided with a choice to initiate the call from an associated mobile terminal associated with directory number DN0; the first terminal (office) 24 associated with directory number DN1; a PC associated with the address user1@isp.com, or the computing terminal 12. Assume that the first terminal 24 is selected to use for the call, as indicated by the highlighting. Selecting the mobile, office, or PC terminals would result in an indirect establishment of a call from the selected endpoint to the remote endpoint, whereas selection of the computing terminal 12 would result in a direct initiation of a call from the computing terminal 12 using an integrated communication client 14'.

The pop-up window 48 is configured to allow the user to readily provide any user indicia to assist with initiating the call. The user indicia may take various forms including source information and context information. The source information corresponds to the particular endpoint of the user to use when establishing the call, while the context information provides information bearing on a context associated with the call. The context information may vary significantly from one application to another. As illustrated, the context information may identify a preferred language to associate with the call, whether the call is private, and the type of call being established. The type of call may identify the call as a personal, business, commercial, support call, or the like. When the user selects "OK," any appropriate source, destination, and context information is sent to the web server 16 in association with a request to initiate a call.

Figure 4:
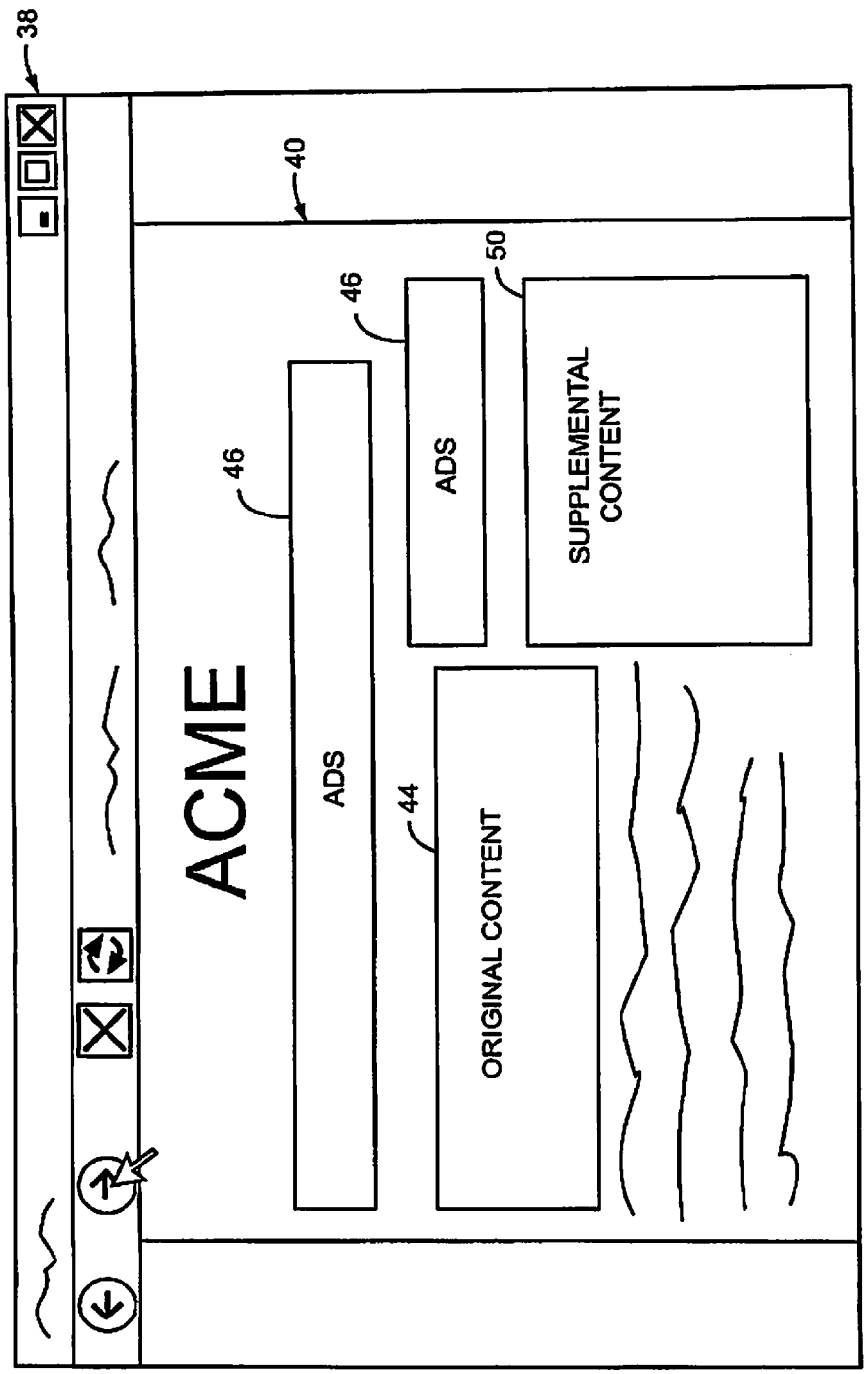
FIG. 4 illustrates a pop-up window including supplemental content provided according to one embodiment of the present invention.
Figure 5:
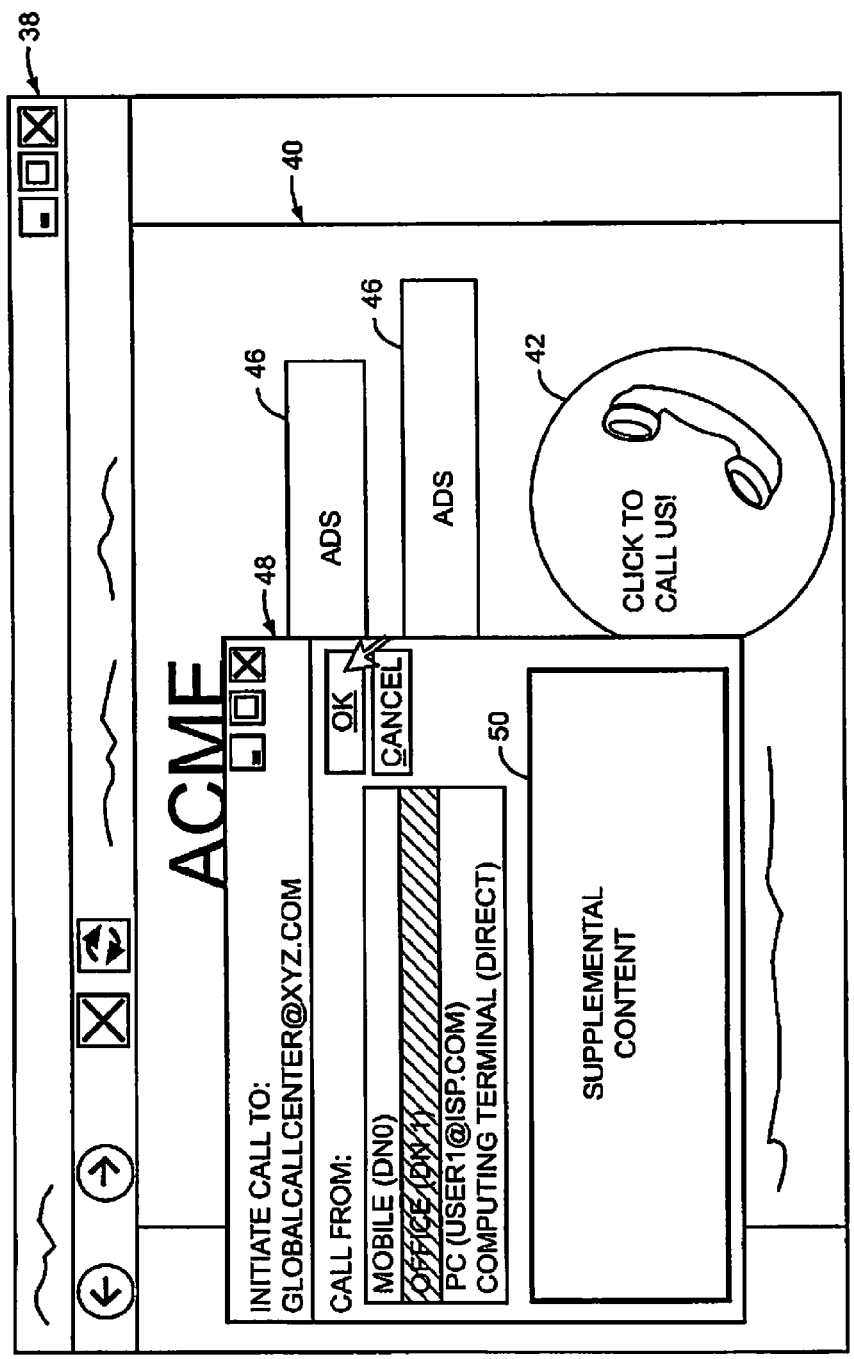
FIG. 5 illustrates a pop-up window including supplemental content provided according to a second embodiment of the present invention.

Once a C2C call is initiated and placed on hold for some reason, select supplemental content may be provided directly to the computing terminal 12 and presented to the user. In one embodiment, the supplemental content is provided to the computing terminal 12 over the Internet 18 and outside of any bearer path associated with the C2C call. As such, the supplemental content may be readily presented to the user via the browser 14 and associated media applications. Any one or combination of the browser 14 and the associated media applications is referred to collectively as a web client, and may be used to present various types of media to the user. In one embodiment, the supplemental content is presented to the user via the browser 14 as part of a web page. Notably, the supplemental content may be provided in a modified web page 40, as illustrated in FIG. 4, or in a modified pop-up window 48, as illustrated in FIG. 5. The supplemental content is referenced as supplemental content 50 to distinguish it from the previously presented original content. The supplemental content 50 may be dynamically updated and presented to the user. Further, the supplemental content 50 may include interactive content, such as gaming content, which may run on the computing terminal 12 or require interaction between the computing terminal 12 and a remote entity, such as one of the content servers 34.

Figure 6:
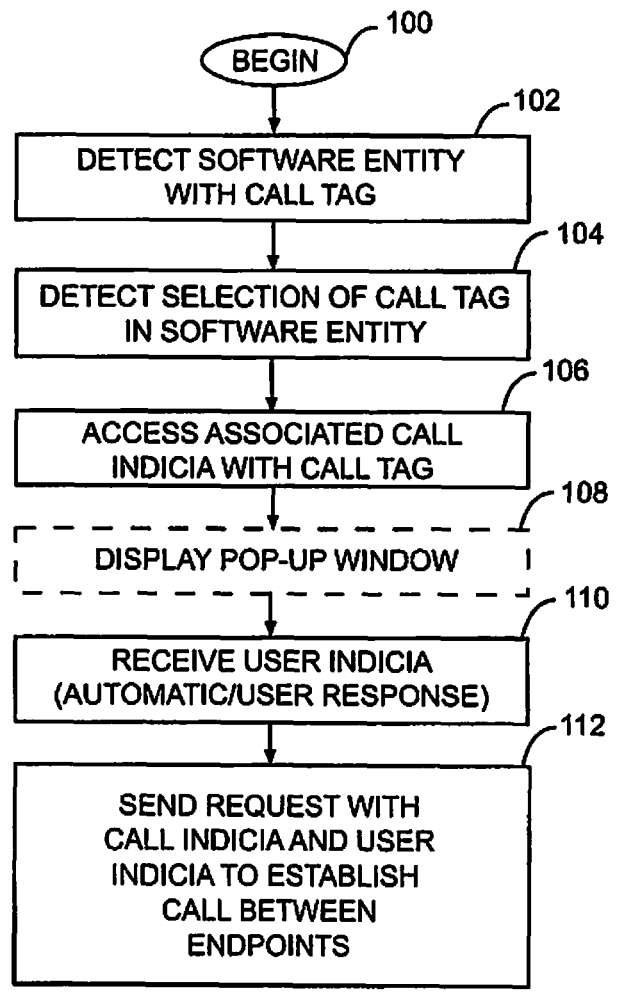
FIG. 6 is a flow diagram illustrating the operation of a computing terminal according to one embodiment of the present invention.

With reference to FIG. 6, a flow diagram is provided to illustrate initiating of a C2C call according to one embodiment of the present invention. The process begins (step 100) wherein the computing terminal 12 detects the presence or activation of a software entity, such as the web page 40 having a call tag 42 (step 102). The computing terminal 12 will then detect when the call tag 42 associated with the software entity is selected (step 104). The call indicia associated with the call tag 42 is accessed (step 106), and if desired, a pop-up window 48 or like message is provided to the user (step 108). The pop-up window 48 provides a vehicle for receiving user indicia associated with selecting the call tag 42; however, other vehicles are available, such as another function or application. The computing terminal 12 may retrieve any user indicia in an automatic fashion, if predefined rules are established, or through an appropriate user response (step 110).

The computing terminal 12 may then send a request with any necessary call indicia and user indicia, including source, destination, and any available context information, to the web server 16 for delivery to the service node 20, or directly to the service node 20 (step 112). The service node 20 may then initiate establishment of a call between one of the user's endpoints associated with the source information and a remote endpoint associated with the destination information based on the call indicia in light of any pertinent user indicia. For indirect call initiation, the computing terminal 12 is generally not involved in the call once the call is established; however, the computing terminal 12 will be able to receive the supplemental content 50 associated with the call. For direct call initiation, the computing terminal 12 will originate the call to the remote endpoint.

Figure 7A:
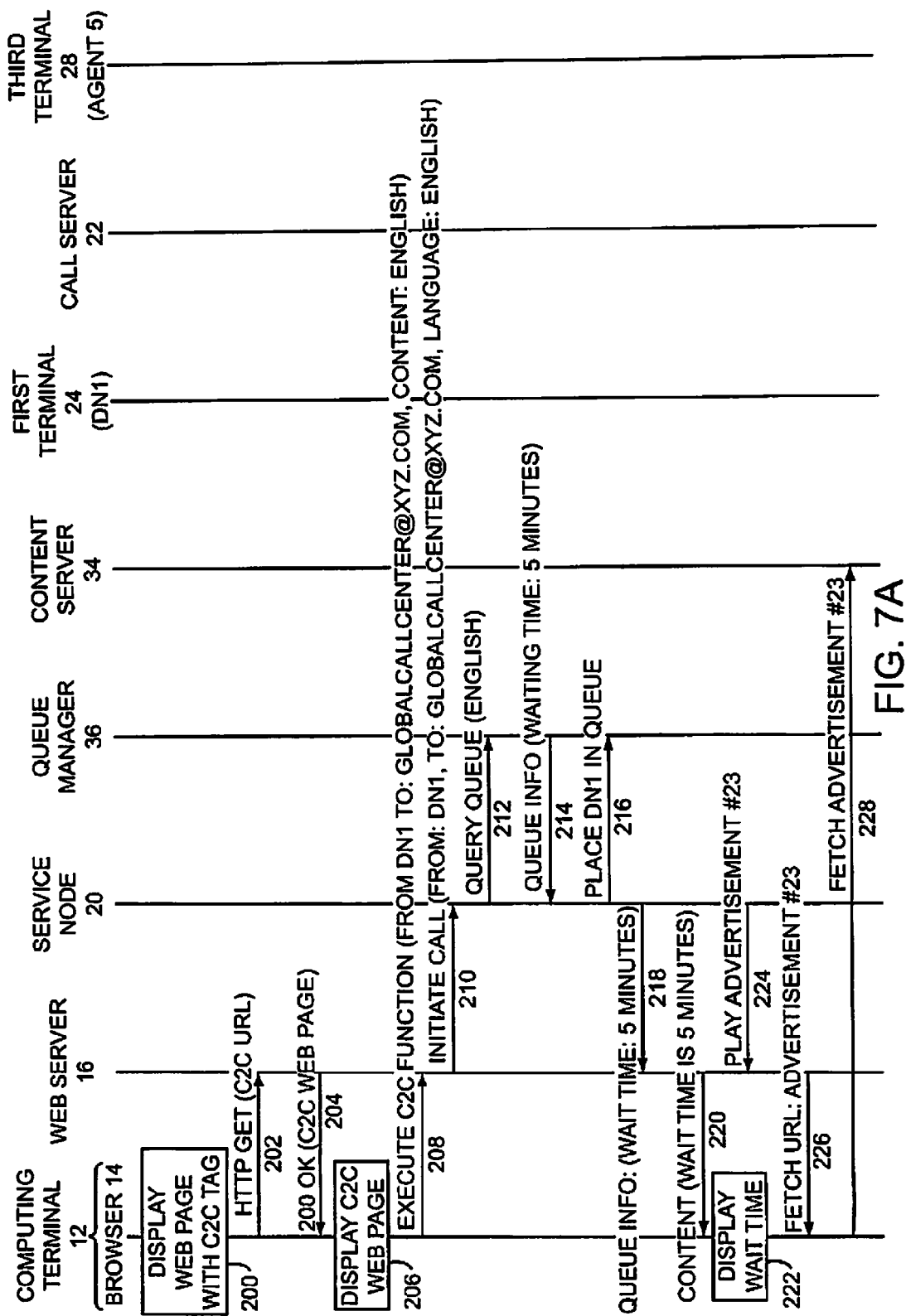
FIGS. 7A-7C are a communication flow diagram illustrating exemplary operation of one embodiment of the present invention.
Figure 7B:
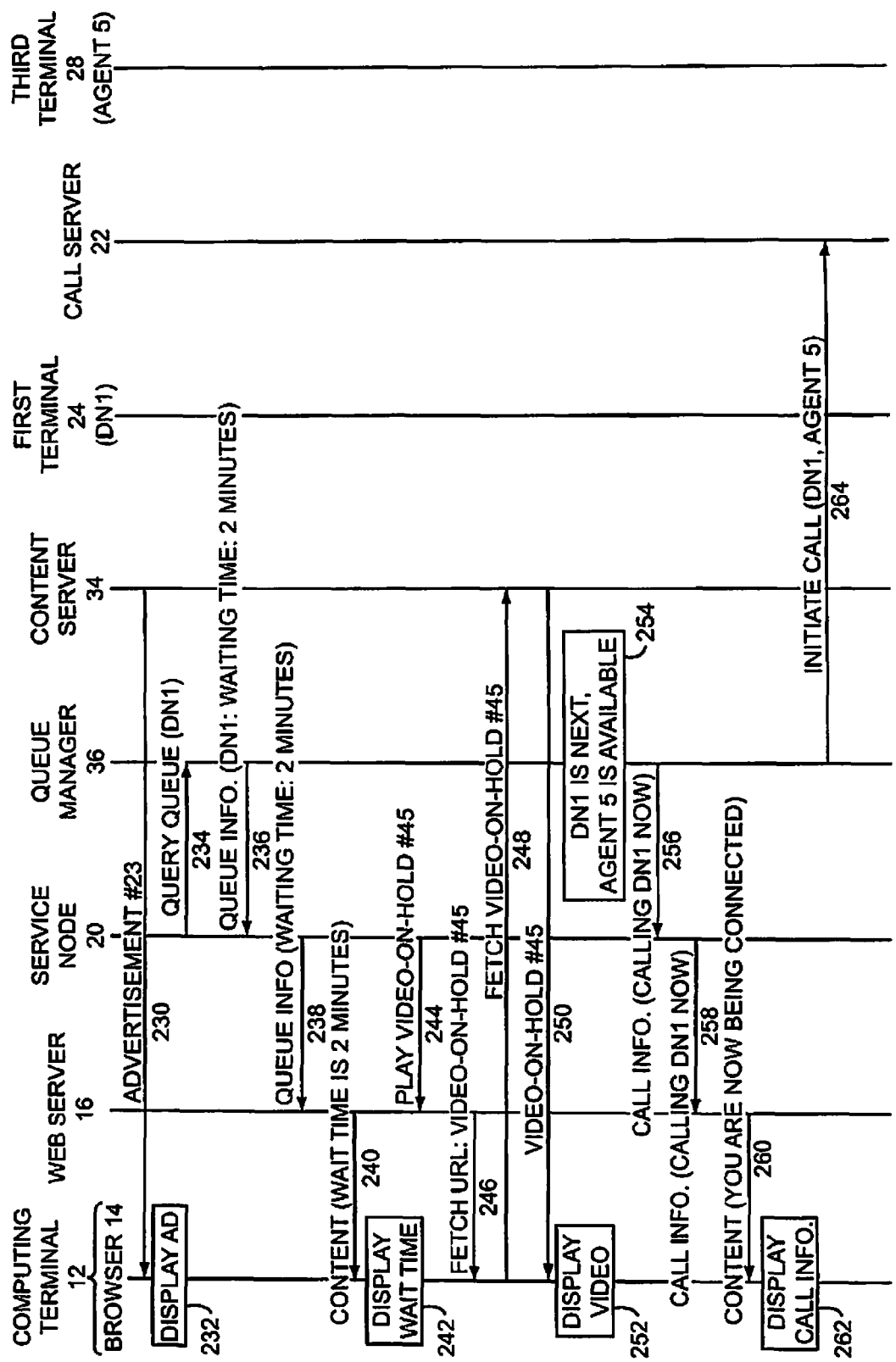
Figure 7C:
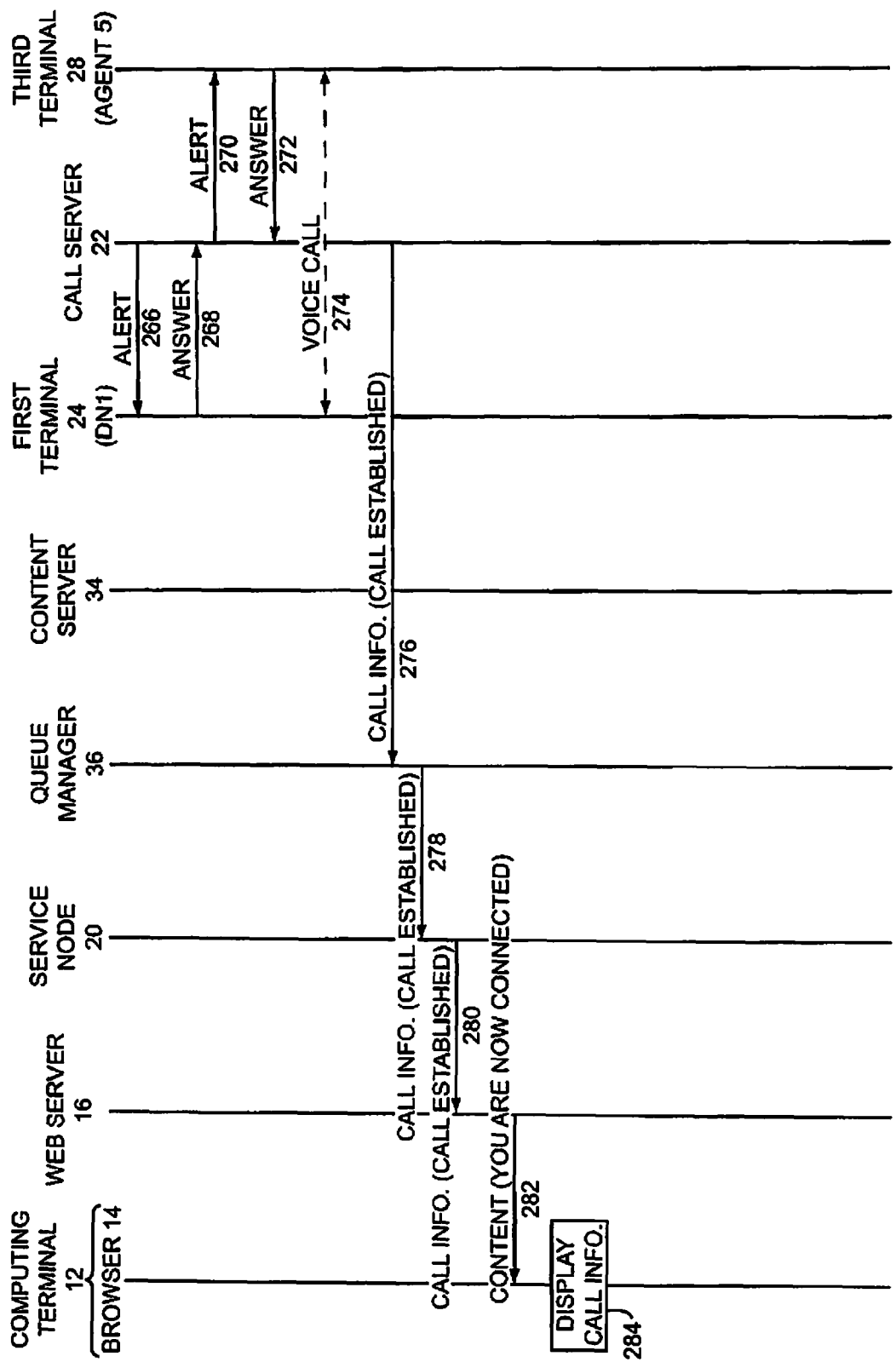

Turning now to FIGS. 7A-7C, a communication flow is provided to illustrate exemplary operation of one embodiment of the present invention. Initially, the browser 14 will receive and display a web page with a C2C tag 42 (step 200). When the user selects the C2C tag 42, the browser 14 may send to the web server 16 a hypertext transfer protocol (HTTP) GET message to obtain the content of the URL associated with a C2C web page (step 202). Based on the URL, the web server 16 will send a 200 OK message back to the browser 14 with the requested C2C web page 40 (step 204). The browser 14 will then display the C2C web page 40 to the user, perhaps in the form of a pop-up window 48 (step 206). If the user elects to initiate a call, any necessary user information is retrieved automatically or from the user, and the browser 14 will send a message back to the web server 16 to execute a C2C function (step 208). In this example, the message includes source information having the directory number DN1 as the source address, which is associated with the first terminal 24. The message sent to the web server 16 may also identify a specific or general destination for the call as well as any context information. In this case, a general destination is provided and is represented by globalcallcenter@xyz.com. The context information indicates that an English-speaking representative is requested. The web server 16 will recognize that a C2C call has been requested and will send an Initiate Call message to the service node 20 (step 210). The Initiate Call message will indicate that the call should be from a source address (DN1) to a general destination (globalcallcenter@xyz.com). The Initiate Call message may also provide the context information, which in this case indicates that the call can or should be sent to a destination where English is spoken.

In response to receiving the Initiate Call message from the browser 14, the service node 20 may send a query to the queue manager 36 to determine an estimated amount of time that the call will be queued, and thus effectively placed on hold, until an English-speaking agent is available (step 212). The queue manager 36 will determine the wait time for an English-speaking agent, and send appropriate queue information identifying the estimated wait time for the call to be answered back to the service node 20 (step 214). In this instance, assume the estimated waiting time is 5 minutes. The estimated waiting time provided by the queue manager 36 is considered supplemental content 50, and will be provided to the browser 14 or other application running on the computing terminal 12. As such, the service node 20 will provide instructions to place the call associated with directory number DN1 in the queue to the queue manager 36 (step 216), which will place the call in the queue. In this example, the bearer path for the call will not be established until an agent becomes available, as will become apparent below.

The service node 20 will process the supplemental content, which bears on the waiting time until an agent becomes available, and will send the supplemental content as queue information to the web server 16 (step 218). The web server 16 will present the queue information as content to be displayed via the browser 14 to the computing terminal 12 (step 220). The browser 14 may process the content and display the estimated wait time to the user (step 222). As such, supplemental content 50 was provided by the queue manager 36 to the computing terminal 12 for presentation to the user, outside of the bearer path for the call, which has yet to be established.

Next, assume the service node 20 is configured to present additional supplemental content in the form of an advertisement to the computing terminal 12 for presentation to the user. In this example, the service node 20 will identify an advertisement, advertisement #23, to present to the user and will forward instructions to the web server 16 (step 224). The web server 16 will in turn instruct the browser 14 to fetch the advertisement from an appropriate content server 34 (step 226). The instructions provided to the browser 14 via the web server 16 may include a URL identifying the location of the advertisement at the content server 34. As such, the browser 14 may send a message to the content server 34 to fetch advertisement #23 (step 228). In response, the content server 34 will deliver advertisement #23 to the computing terminal 12 for presentation to the user (step 230). In one embodiment, the advertisement is presented to the user via the browser 14.

The advertisement may represent relatively static graphic content, or streaming audio or video, which represents the advertising content. Accordingly, the browser 14 will present or begin presenting advertisement #23 to the user (step 232).

In the meantime, the service node 20 may periodically send a query to the queue manager 36 for the call associated with directory number DN1 (step 234). The queue manager 36 will respond to the query by providing an updated estimate for the remaining wait time until an agent is available in a queue information message to the service node 20 (step 236). In this instance, the estimated waiting time is approximately 2 minutes. The service node 20 will send the queue information to the web server 16 (step 238), which will deliver content indicating that the estimated wait time is 2 minutes to the computing terminal 12 (step 240) for presentation to the user (step 242).

Although supplemental content 50 in the form of an estimated wait time and an advertisement has been presented to the computing terminal 12 outside of the bearer path associated with the call, additional supplemental content 50 may be provided as desired by the call center. In the illustrated communication flow, the service node 20 is further configured to effect delivery of video-on-hold message #45 to the user for the remaining portion of the wait time. As such, the service node 20 will send an instruction to the web server 16 to have the computing terminal 12 play video-on-hold message #45 (step 244). Upon receipt of these instructions, the web server 16 will provide instructions to the browser 14 to fetch video-on-hold message #45 using an appropriate URL, which was provided by the service node 20 (step 246). The browser 14 will send a message to fetch video-on-hold message #45 to the content server 34 (step 248), which will respond by streaming video-on-hold message #45 to the browser 14 (step 250), for presentation to the user (step 252).

When the queue manager 36 determines that the wait time for the call is over and that a select agent, such as Agent 5, is available (step 254), a corresponding message may be sent to the service node 20 (step 256). The message may include call information indicating that the call is ready to be presented to Agent 5, and as such, the service node 20 may send the call information to the web server 16 (step 258). The web server 16 may generate appropriate content indicating that the call is being established to the computing terminal 12 (step 260), which will display the call information to the user (step 262).

Meanwhile, the queue manager 36 will take the necessary steps to initiate the call associated with DN1 to Agent 5. This initiation will generally include the queue manager 36 sending an instruction to initiate the call to the call server 22 (step 264). The third party call control messaging is significantly abbreviated merely to illustrate the concepts of initiating the respective legs of the call and establishing a voice path between the respective endpoints. As such, assume the call server 22 effectively sends an Alert toward the first terminal 24 (step 266), which when answered will send an Answer message back to the call server 22 (step 268). Similarly, the call server 22 will effectively send an Alert toward the third terminal 28 (step 270), which when answered will send an Answer message back to the call server 22 (step 272). Once both parties have answered, a bearer path is established between the first terminal 24 and the third terminal 28 (step 274).

At this point, the call server 22 may initiate delivery of supplemental content in the form of call information to the computing terminal 12. In particular, the call information indicating the call has been established is sent to the queue manager 36 (step 276), which forwards the call information to the service node 20 (step 278). The service node 20 will send the call information to the web server 16 (step 280), which will generate the appropriate content to provide to the computer terminal 12 to indicate that the call is established (step 282). As illustrated, the content is a message stating "You are now connected," and such call information is displayed to the user (step 284). Again, supplemental content is presented to the user in various forms and from different entities in association with a call being placed on hold. The supplemental content is not communicated over the bearer path for the call, and may be provided before, during, or after establishment of the bearer path.

Figure 8:
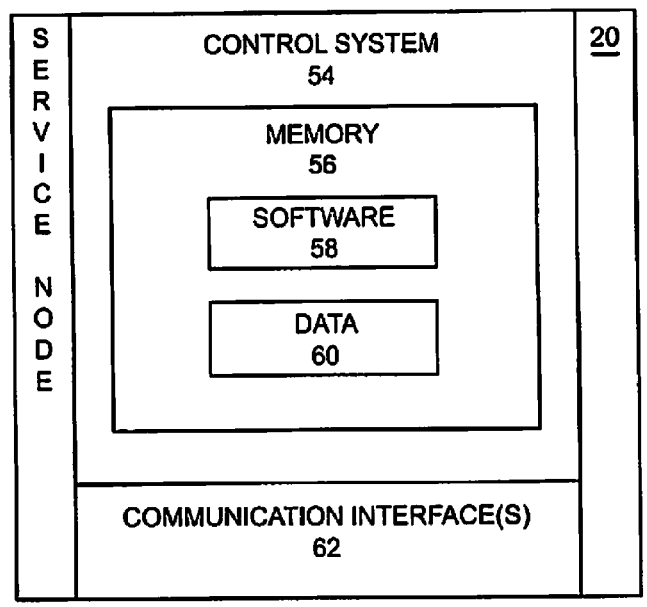
FIG. 8 is a block representation of a service node according to one embodiment of the present invention.

With reference to FIG. 8, a block diagram of a service node 20 is illustrated. The service node 20 may include a control system 54 with sufficient memory 56 for the requisite software 58 and data 60 to operate as described above. One or more communication interfaces 62 may be provided to facilitate communication with various entities, including the computing terminal 12, web server 16, content servers 34, call servers 22, and the like.

Figure 9:
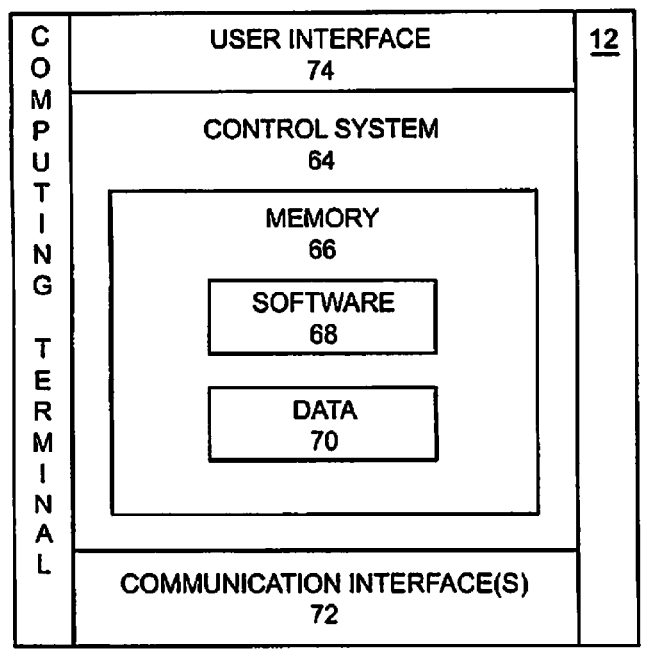
FIG. 9 is a block representation of a computing terminal according to one embodiment of the present invention.

With reference to FIG. 9, a block representation of a computing terminal 12 is illustrated. The computing terminal 12 may include a control system 64 with sufficient memory 66 for the requisite software 68 and data 70 to operate as described above. The software 68 may support various applications supporting various electronic documents, wherein certain of the applications or electronic documents may represent a software entity. The software 68 may also support all or a portion of the communication client 14' as well as the browser 14, which may also be a software entity. The control system 64 may also be associated with any number of communication interfaces 72, to facilitate communications with any variety of networks, including the Internet 18, VoP network 32, and the PSTN 30. The control system 64 may include a user interface 74 to obtain information from the user and deliver information to the user as well as support voice-based telephony calls, if so desired.

Figure 10:
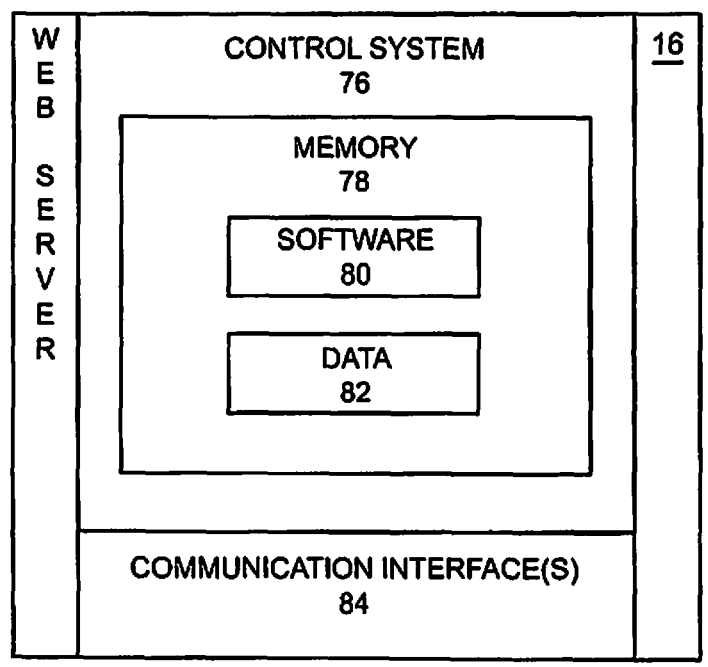
FIG. 10 is a block representation of a web server according to one embodiment of the present invention.

With reference to FIG. 10, a block representation of a web server 16 is illustrated. The web server 16 may include a control system 76 with sufficient memory 78 for the requisite software 80 and data 82 to operate as described above. One or more communication interfaces 84 may be provided to facilitate communication with various entities, including the computing terminal 12, service node 20, content servers 34, call servers 22, and the like.

Those skilled in the art will recognize improvements and modifications to the preferred embodiments of the present invention. All such improvements and modifications are considered within the scope of the concepts disclosed herein and the claims that follow.

What is claimed is:

1. A method of delivering supplemental content to a caller in association with a click-to-call communication session, the method comprising:
   receiving a request to initiate the click-to-call communication session;
   acquiring supplemental content to be delivered to a device associated with the caller before establishment of the click-to-call communication session; and
   delivering, outside of a bearer path for the click-to-call communication session, the supplemental content to the device associated with the caller.

2. The method of claim 1, wherein:
   receiving the request to initiate the click-to-call communication session comprises receiving the communication session initiation signaling at a service node in a communication network;
   acquiring the supplemental content to be delivered to the device associated with the caller before establishment of the click-to-call communication session comprises acquiring the supplemental content at the service node; and
   delivering the supplemental content to the device associated with the caller comprises delivering the supplemental content from the service node to the device associated with the caller.

3. The method of claim 2, wherein receiving the communication session initiation signaling at the service node comprises receiving the request to initiate the click-to-call communication session from the device associated with the caller at a web server connected to the communication network and sending communication session initiation signaling from the web server to the service node.

4. The method of claim 3, wherein delivering the supplemental content from the service node to the device associated with the caller comprises delivering the supplemental content to the device associated with the caller via the web server.

5. The method of claim 2, wherein acquiring the supplemental content to be delivered to the device associated with the caller comprises:
requesting supplemental content from a node connected to the communication network other than the service node; and
receiving the supplemental content from the node other than the service node.

6. The method of claim 5 further comprising:
receiving a request for the supplemental content from the service node at the node other than the service node via the communication network; and
sending the supplemental content from the node other than the service node to the service node responsive to receiving the request for the supplemental content.

7. The method of claim 5 further comprising placing the requested click-to-call communication session in a queue, wherein requesting the supplemental content from the node connected to the communication network other than the service node comprises requesting queue information associated with the requested click-to-call communication session from a queue manager.

8. The method of claim 5, wherein requesting the supplemental content from a node connected to the communication network other than the service node comprises requesting an advertisement from a content server connected to the communication network.

9. The method of claim 5, wherein requesting the supplemental content from a node connected to the communication network other than the service node comprises requesting video content from a content server connected to the communication network.

10. The method of claim 2, wherein:
acquiring the supplemental content to be delivered to the device associated with the caller before establishment of the click-to-call communication session comprises receiving call progress information at the service node; and
delivering the supplemental content to the device associated with the caller comprises delivering the call progress information from the service node to the device associated with the caller.

11. The method of claim 10, wherein receiving the call progress information at the service node comprises receiving call progress information from a queue manager.

12. The method of claim 10, wherein receiving the call progress information at the service node comprises receiving call progress information from a call server.

13. The method of claim 1, wherein the request to initiate the click-to-call communication session comprises caller indicia.

14. The method of claim 13, wherein the caller indicia comprises context information.

15. The method of claim 14, comprising selecting the supplemental content based on, at least in part, the caller indicia before delivering the supplemental content.

16. The method of claim 1, wherein the supplemental content is at least one of call progress information, advertising, a modified web page, a modified pop-up window, video on hold content, streaming media and interactive content.

17. The method of claim 1, wherein the click-to-call communication session is a communication session with a contact center, the method further comprising:
querying a queue manager to determine an estimated time before an agent is available; and
determining the supplemental content to be delivered based on, at least in part, the estimated time.

18. The method of claim 17, wherein the supplemental content comprises the estimated time.

19. The method of claim 1, wherein delivering the supplemental content comprises sending to a web server instructions for supplying the supplemental content to the device associated with the caller in association with the click-to-call communication session.

20. The method of claim 19, wherein the instructions to the web server identify the supplemental content to be supplied.

21. The method of claim 19, wherein the instructions to the web server contain supplemental content.

22. The method of claim 1, wherein the supplemental content is delivered before the bearer path is established.

23. The method of claim 22, comprising delivering further supplemental content after the bearer path is established.

24. The method of claim 1, comprising dynamically updating the supplemental content.

25. The method of claim 1, comprising delivering the dynamically updated supplemental content.

26. The method of claim 1, comprising configuring a communication session between a communication terminal associated with the caller and a communication terminal associated with the request to initiate the click-to-call communication session.

27. The method of claim 26, wherein the communication terminal associated with the request to initiate the click-to-call communication session is a communication terminal associated with a provider of a web page from which the caller initiated the request to initiate the click-to-call communication session.

28. The method of claim 26, wherein the communication terminal associated with the caller is specified in the request to initiate the click-to-call communication session.

29. The method of claim 28, wherein the communication terminal associated with the caller that is specified in the request to initiate the click-to-call communication session is specified by the caller.

30. The method of claim 29, wherein the communication terminal associated with the caller that is specified in the request to initiate the click-to-call communication session is specified by the caller by filling a form on a web page.

31. The method of claim 26, wherein configuring the communication session comprises configuring a voice communication session.

32. The method of claim 31, wherein configuring the voice communication session comprises configuring a voice call to a voice communication terminal associated with the caller.

33. The method of claim 32, wherein configuring the voice call to the voice communication terminal associated with the caller comprises configuring a voice path over a public switched telephone network (PSTN).

34. The method of claim 1, wherein delivering the supplemental content to the device associated with the caller comprises delivering interactive content.

35. The method of claim 34, wherein delivering the interactive content comprises delivering at least one game that can be played by the caller.

* * * * *